(12) United States Patent
Bennett et al.

(10) Patent No.: US 10,991,214 B2
(45) Date of Patent: Apr. 27, 2021

(54) REMOTE REESTABLISHMENT OF ONE-WAY COMMUNICATIONS SESSION WITH MOBILE BUG

(71) Applicant: Callyo 2009 Corp, St. Peterburg, FL (US)

(72) Inventors: Christopher Ryan Bennett, St. Petersburg, FL (US); Derek Anthony Seroky, Tampa, FL (US)

(73) Assignee: CALLYO 2009 CORP, St. Petersburg, FL (US)

( * ) Notice: Subject to any disclaimer, the term of this patent is extended or adjusted under 35 U.S.C. 154(b) by 6 days.

(21) Appl. No.: 16/438,809

(22) Filed: Jun. 12, 2019

(65) Prior Publication Data

US 2020/0383163 A1    Dec. 3, 2020

Related U.S. Application Data

(60) Provisional application No. 62/854,552, filed on May 30, 2019.

(51) Int. Cl.
*H04W 76/19* (2018.01)
*G08B 6/00* (2006.01)
(Continued)

(52) U.S. Cl.
CPC .............. *G08B 6/00* (2013.01); *G06F 3/165* (2013.01); *G06F 21/602* (2013.01); *H04M 1/656* (2013.01); *H04M 3/2281* (2013.01); *H04W 4/90* (2018.02); *H04W 12/02* (2013.01); *H04W 76/10* (2018.02); *H04W 76/19* (2018.02); *H04W 80/10* (2013.01)

(58) Field of Classification Search
None
See application file for complete search history.

(56) References Cited

U.S. PATENT DOCUMENTS 10,187,518 B2    1/2019 Bennett
10,360,775 B1    7/2019 Saboune et al.
(Continued)

OTHER PUBLICATIONS

United States Ex Parte Quayle Action, U.S. Appl. No. 16/511,949, Apr. 3, 2020, 9 pages.

*Primary Examiner* — Otis L Thompson, Jr.
(74) *Attorney, Agent, or Firm* — Daniel Bestor (57) ABSTRACT

A system and a method are disclosed for reestablishing a mobile bug communications session. In an embodiment, a service establishes a one-way communications session between a mobile bug and a monitoring device, the one-way communications session providing data from the mobile bug to the monitoring device during the one-way communications session without audio being provided from the monitoring device to the mobile bug during the one-way communications session. The service detects a break in the one-way communications session, and determines whether the monitoring device has activated a remote reestablishment feature. Responsive determining that the monitoring device has activated the remote reestablishment feature, the service instructs the monitoring device to output an option to reestablish the one-way communications session. Responsive to detecting a selection of the option, the service corrects the break in the one-way communications session.

20 Claims, 6 Drawing Sheets

(51) Int. Cl.

| | |
|---|---|
| *H04W 4/90* | (2018.01) |
| *H04W 76/10* | (2018.01) |
| *G06F 3/16* | (2006.01) |
| *G06F 21/60* | (2013.01) |
| *H04M 1/656* | (2006.01) |
| *H04M 3/22* | (2006.01) |
| *H04W 12/02* | (2009.01) |
| *H04W 80/10* | (2009.01) |

(56) References Cited

U.S. PATENT DOCUMENTS

| | | | |
|---|---|---|---|
| 10,796,542 B1 * | 10/2020 | Bennett | ................... H04W 4/90 |
| 2012/0309379 A1 * | 12/2012 | Bennett | ................ H04L 61/605 |
| | | | 455/419 |
| 2015/0070150 A1 | 3/2015 | Levesque et al. | |
| 2015/0170023 A1 | 6/2015 | Chatterjee et al. | |
| 2016/0178906 A1 | 6/2016 | Rider et al. | |
| 2016/0189116 A1 | 6/2016 | Cattone | |
| 2016/0309012 A1 * | 10/2016 | Bennett | ................ H04M 1/656 |
| 2019/0163272 A1 | 5/2019 | Khare et al. | |

* cited by examiner

REMOTE REESTABLISHMENT OF ONE-WAY COMMUNICATIONS SESSION WITH MOBILE BUG

CROSS REFERENCE TO RELATED APPLICATIONS

This application claims the benefit of U.S. Provisional Patent Application No. 62/854,552, filed May 30, 2019, the disclosure of which is hereby incorporated by reference herein in its entirety.

TECHNICAL FIELD

The disclosure generally relates to the field of covert mobile bug (e.g., cellular body wire) applications, and more specifically to reestablishment following a break in a one-way communication session between a mobile bug and a monitoring device, the reestablishment being requested by the monitoring device.

BACKGROUND

In covert operations scenarios where a transmitting person has audio transmitted to a monitoring team, it is risky for the transmitting person to carry a transmitting device, as the transmitting device can be discovered by a bad guy, thus compromising the transmitting person's identity and safety. Related art systems thus enable cellular telephones to be configured to act as a transmitting device, where the transmitting device initiates audio, and then the monitoring team can listen in. In such scenarios, the risk of the transmitting person being caught is reduced because it is not obvious that the cellular telephone is being used to transmit audio. However, if a loss in cellular service causes the audio connection between the transmitting device and the monitoring team to break, and the transmitting person is unable to reinitiate the audio, or unaware that the audio connection has broken, then the monitoring team will have no recourse to continue listening to the audio.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment including a mobile bug, a monitoring device, and a monitoring service.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes enabling a monitoring device configured to remotely reestablish a one-way communications session. A benefit of this embodiment is enabling the one-way communications session to be reestablished even in an absence of an ability of a transmitting person to reestablish the one-way communications session. Privacy controls may be implemented to ensure that a one-way communications session is not initiated against the will of the transmitting person.

In an embodiment, a monitoring service establishes a one-way communications session between a mobile bug and a monitoring device, the one-way communications session providing data from the mobile bug to the monitoring device during the one-way communications session without audio being provided from the monitoring device to the mobile bug during the one-way communications session. The monitoring service detects a break in the one-way communications session, and determines whether the monitoring device has activated a remote reestablishment feature. Responsive determining that the monitoring device has activated the remote reestablishment feature, the monitoring service instructs the monitoring device to output an option to reestablish the one-way communications session. Responsive to detecting a selection of the option, the monitoring service corrects the break in the one-way communications session.

Mobile Bug System Environment

Figure 1:
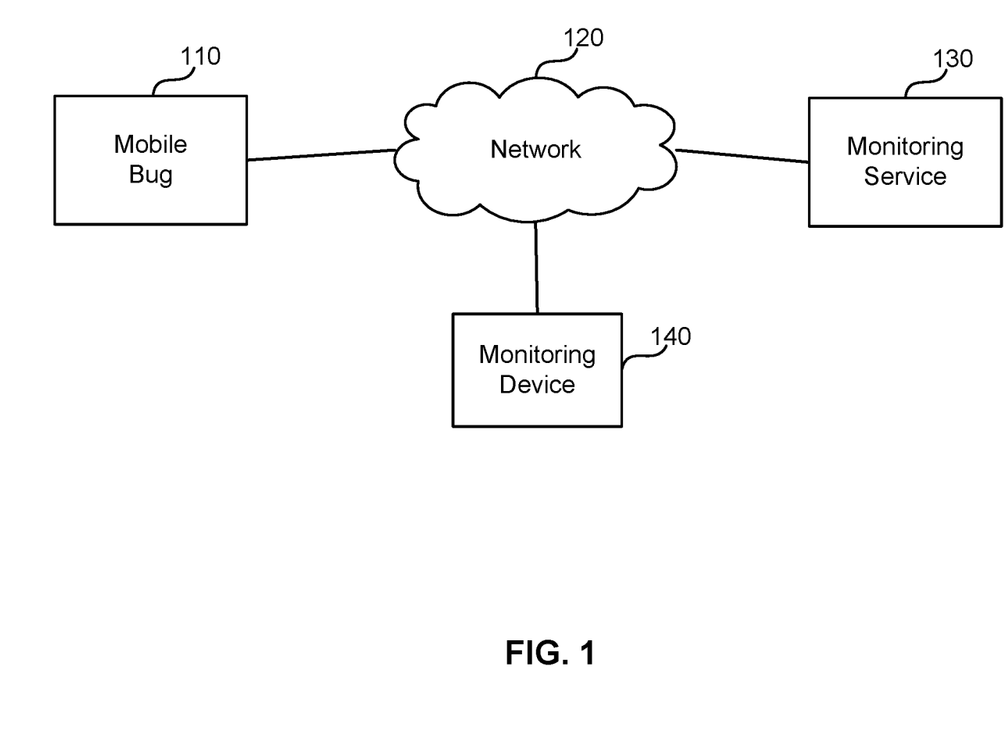

FIG. 1 illustrates one embodiment of a system environment including a mobile bug, a monitoring device, and a monitoring service. FIG. 1 depicts environment 100, which includes mobile bug 110, network 120, monitoring service 130, and monitoring device 140. Mobile bug 110 may be any client device, including but not limited to smartphones, laptops, wearable devices such as smart watches, Internet-of-Things devices, peripheral devices, and the like. While only one mobile bug 110 is depicted, several mobile bugs may be included within environment 100.

Mobile bug 110 is configured to transmit data, which may include audio, location data (e.g., GPS data), video, and any other data requested by monitoring device 140, over network 120 during a one-way communications session. The data may be transmitted over a single connection (e.g., a data component of a cellular signal, WiFi, Wide Area Network signal, or similar), or may be split across multiple connections (e.g., audio components transmitted over a public-switched telephony network; data components such as GPS and/or video transmitted over data networks, etc.). Network 120 may include infrastructure for single connection or split connection transmissions. Further functionality of network 120 is described below with reference to FIG. 5.

As used herein, the term one-way communications session may refer to a session where mobile bug 110 transmits data without outputting received data from a user interface of mobile bug 110. In an embodiment, during the one-way communications session, mobile bug 110 does not receive data from monitoring device 140. Alternatively, mobile bug 110 receives data from monitoring device 140 during the one-way communications session, but does not output (e.g., display or output audio through speaker) the received data. Further details about the functionality of mobile bugs are described in commonly-owned U.S. Pat. No. 10,187,518, filed May 12, 2017, and issued Jan. 22, 2019, the disclosure of which is hereby incorporated by reference herein in its entirety.

Monitoring service 130 facilitates establishment and reestablishment of a one-way communications session. As will be described in further detail with reference to FIG. 3, monitoring service 130 registers mobile bug 110 as a mobile bug, and monitoring device 140 as a monitoring device. Monitoring service 130 may receive a request to establish, or reestablish, a one-way communications session between mobile bug 110 and monitoring device 140 from either mobile bug 110 or monitoring device 140. Responsive to receiving the request, monitoring service 130 transmits instructions to mobile bug 110 to output data to monitoring device 140. In an embodiment, the instructions to mobile bug 110 include instructions to output the data to monitoring service 130 (e.g., for recording the data to memory for replay at a later time, for encrypting the data before it is passed to monitoring device 140, and the like). Monitoring service 130 may be implemented within one or more servers within environment 100. Some functionality of monitoring service 130 may be distributed to mobile bug 110 and/or monitoring device 140 (e.g., through an application installed on mobile bug 110 and/or monitoring device 140).

Monitoring device 140 may request that a one-way communications session between mobile bug 110 and monitoring device 140 be established, or reestablished. Monitoring device 140 receives data from mobile bug 110. Monitoring device 140 may output the received data in real-time or near-real-time to one or more users of monitoring device 140 (e.g., by outputting audio using speakers operably coupled to monitoring device 140, by outputting GPS coordinates using a display operably coupled to monitoring device 140, and the like). Monitoring device 140 may store the received data (e.g., in encrypted fashion). Monitoring device 140 may be any client device, such as those described with respect to mobile bug 110, as well as any non-mobile device, such as a large personal computer, a server, and the like. Other client devices are described below with reference to FIG. 5.

Mobile Bug Details

Figure 2:
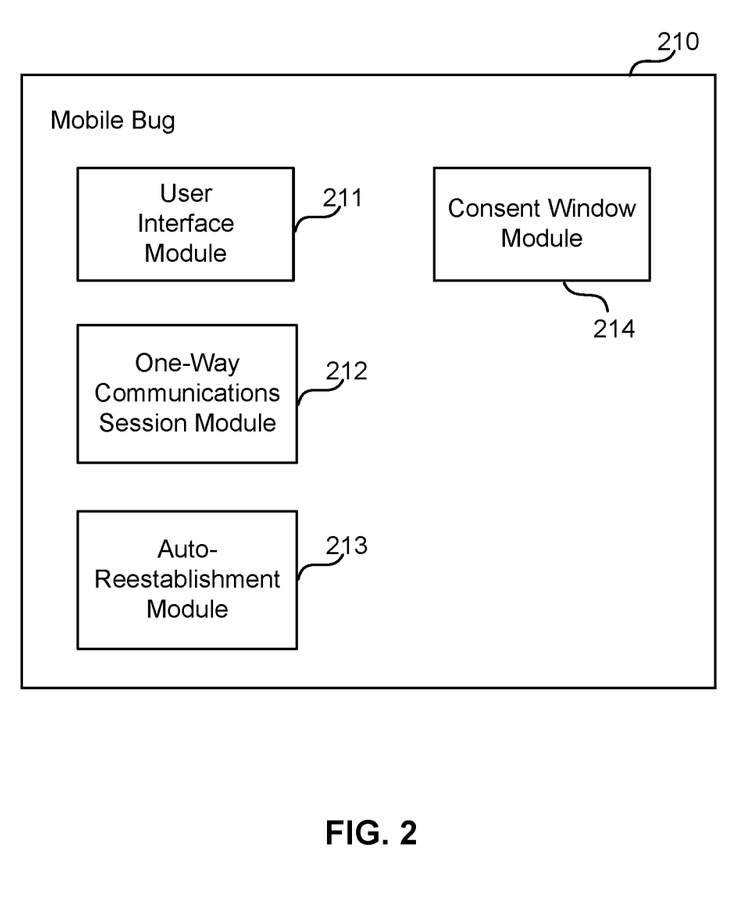
FIG. 2 illustrates one embodiment of a detailed view of modules within a mobile bug.

FIG. 2 illustrates one embodiment of a detailed view of modules within a mobile bug. Mobile bug 210 includes the same functionality described above with respect to mobile bug 110. Mobile bug 210 includes user interface module 211, one-way communications session module 212, auto-reestablishment module 213, and consent window module 214. User interface module 211 enables user input for providing instructions from a transmitting person to monitoring service 130. In an embodiment, user interface module 211 may be provided by a browser that accesses a web address of monitoring service 130. In another embodiment, user interface module 211 may be provided by an application installed to mobile bug 110 that is configured to interact with monitoring service 130 based on user input received from the transmitting person and/or instructions received from monitoring service 130.

The transmitting person may use user interface module 211 to instruct monitoring service 130 to establish a one-way communications session between mobile bug 210 and one or more monitoring devices 140. Additionally, user interface module 211 may be used to enable a user to input a window of consent, which is described below with respect to window of consent module 214. In an embodiment, in order to facilitate the transmitting person by easing establishing a one-way communications session, user interface 211 may be configured to accept a symbol (e.g., a personal identification number, a predefined gesture, etc.) that is predefined to correspond to an establishment request. Responsive to determining that an entered symbol corresponds to an establishment request, user interface module 211 may instruct one-way communications session module 212 to establish a one-way communications session.

One-way communications session module 212, when executed, interacts with monitoring service 130 to establish a one-way communications session. One-way communications session module 212 may be executed based on input from user interface module 211 requesting establishment of a communications session. One-way communications session module 212 may be executed based on instructions from monitoring service 130 to the mobile bug 130 to initiate a one-way communications session (e.g., based on a request from monitoring device 140). Additionally, auto-reestablishment module 213 may detect a break in an already-established one-way communications session, and may command one-way communications session module 212 to execute to reestablish a one-way communications session. Auto-reestablishment module 213 may be disabled by the transmitting person, in which case it would not command reestablishment upon a break. Details of the role of mobile bug 210 in establishing a one-way communications session, or reestablishing a one-way communications session using an auto-reestablishment module (which, e.g., may instruct mobile bug 210 to redial monitoring service 130 and/or monitoring device 140) are described in further detail in commonly-owned U.S. Pat. No. 10,187,518, filed May 12, 2017, and issued Jan. 22, 2019, the disclosure of which is hereby incorporated by reference herein in its entirety.

Consent window module 214, when executed, creates a window of times within which monitoring device 140 may request establishment and/or reestablishment of a one-way communications session. The term consent window, as used herein, may refer to a window of time defined by the transmitting person during which one or more monitoring devices 140 are enabled to establish or reestablish a one-way communications session with mobile bug 210. The transmitting person may input the window of consent into user interface module 211. The consent window may be specific to a particular date or range of dates (e.g., from 2-4 pm on June 5). The consent window may be periodic (e.g., from 2-4 pm every Wednesday) or otherwise recurring. The consent window may be a one-time window on a specified date.

In an embodiment, the consent window may be specific to certain monitoring devices, or even to certain members of a monitoring team, based on a user defining person-based consent windows. For example, if a monitoring team includes Bob and Joe, consent window module 214 may reject a reestablishment request from Bob but accept the reestablishment request from Joe even if Bob attempts to reestablish a one-way communications session during a window of consent. In an embodiment, consent window module 214 may infer the window of consent based on information stored within, or accessible to, mobile bug 210. For example, consent window module 214 may determine that a covert mission is scheduled for a particular date, between particular times, by accessing a calendar application of the transmitting user, or by crawling electronic messages of the transmitting user and parsing information indicating such timing. Consent window module 214 may infer a period of consent for a monitoring team associated with the covert mission during the determined date and times. In an embodiment, the window of consent may be specific to particular data components. For example, the transmitting person may indicate, for each window of consent, particular data components (e.g., audio, GPS, etc.) that are available to the monitoring team during the window of consent, where non-indicated data components are unavailable to the monitoring team during the window of consent.

Consent window module 214 may save consent window information, including windows of consent, as well as user-specific and monitoring device-specific conditions on the windows of consent, to local memory. In an embodiment, consent window module 214 may transmit consent window information to monitoring service 130, where monitoring service 130 is thereby instructed to act as a gatekeeper on establishment or reestablishment requests based on the consent window information, and permit or deny the request depending on whether it complies with the consent window information. In an embodiment, consent window module 214 may circulate the consent window information to monitoring devices 214, or instruct monitoring service 130 to perform the same, to enable members of the monitoring team to conform the times they request establishment or reestablishment of a one-way communications session to the windows of consent.

Monitoring Service Details

Figure 3:
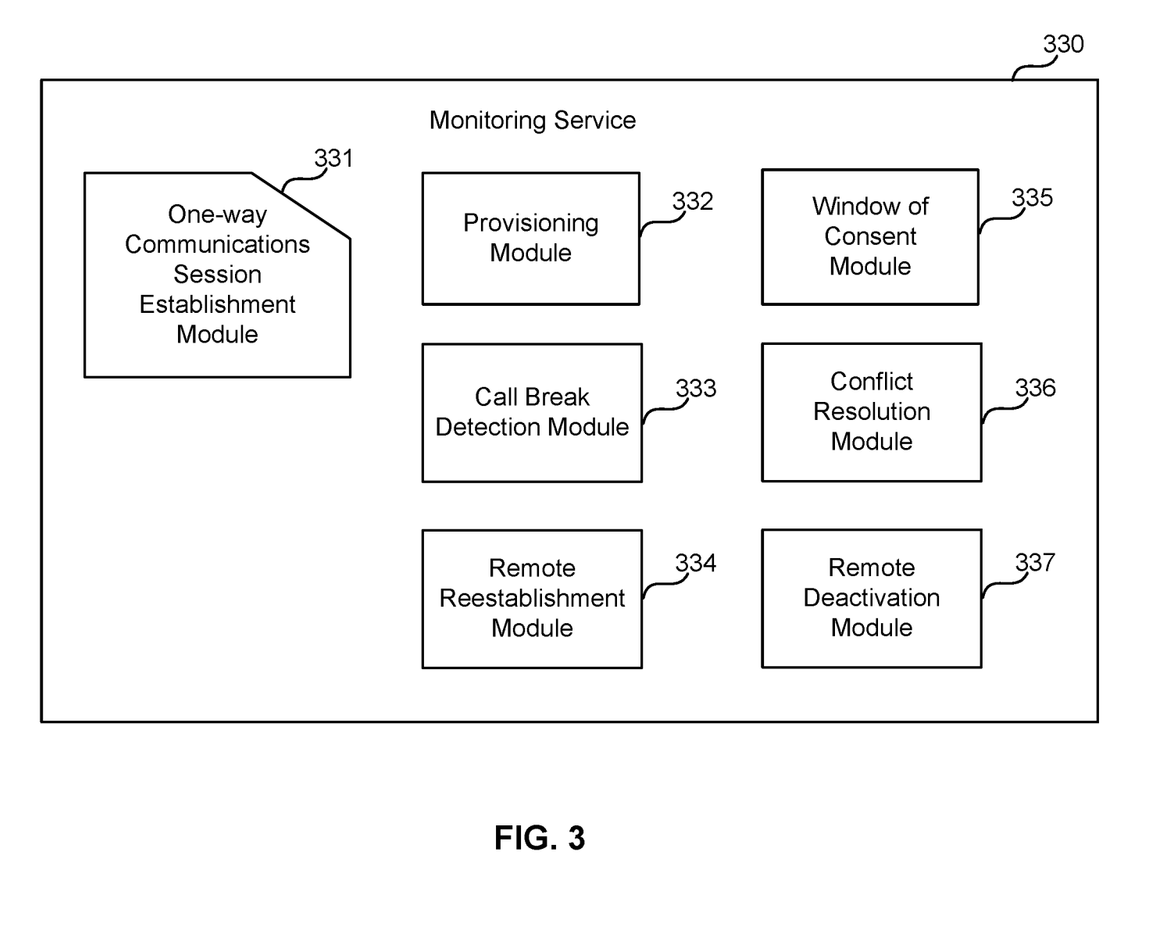
FIG. 3 illustrates one embodiment of a detailed view of modules within a monitoring service.

FIG. 3 illustrates one embodiment of a detailed view of modules within a monitoring service. Monitoring service 330 includes all functionality described above with respect to monitoring service 130, and includes one-way communications session establishment module 331, provisioning module 332, call break detection module 333, remote reestablishment module 334, window of consent module 335, conflict resolution module 336, and remote deactivation module 337. One-way communications session establishment module 331 establishes a one-way communications session between mobile bug 110 and one or more monitoring devices including monitoring device 140, responsive to receiving an instruction to do so from mobile bug 110 and/or monitoring device 140. In an embodiment, one-way communications session establishment module 331 receives an instruction to establish the one-way communications session at a predetermined time, and waits until that predetermined time to establish the one-way communications session.

In order to establish a one-way communications session, monitoring service 130 executes provisioning module 332, which provisions various devices as mobile bugs and as monitoring devices. Based on the provisioning, one-way communications session establishment module determines which devices to establish the one-way communications session between. Further details on initial establishment of a one-way communications session and provisioning of mobile bugs and monitoring devices are described in commonly-owned U.S. Pat. No. 10,187,518, filed May 12, 2017, and issued Jan. 22, 2019, the disclosure of which is hereby incorporated by reference herein in its entirety.

While a one-way communications session is established, call break detection module 333 may detect a break in the one-way communications session. The term break, or call break, as used herein, may refer to an end to a part, or a whole, of a one-way communications session due to a partial or complete deterioration of quality of data transmitted during the one-way communications session, or due to a signal used to carry the data becoming unavailable (e.g., loss of cell signal). Call break detection module 333 may detect a call break where one component of the data (e.g., an audio component) is being transmitted at sufficient quality, but where another component of the data (e.g., a GPS component) is being transmitted at a poor quality (e.g., below a threshold level of quality), or is not being transmitted due to a poor or lost connection. Alternatively, call break detection module 333 may detect a call break where each component of the data is being transmitted at a poor quality, or the connection for all components is lost. Call break detection module 333 may instruct monitoring service 330 to transmit a message to mobile bug 110 and/or monitoring device 140 indicating that the call is broken, and/or that one or more particular components of the data is lost. In an embodiment, call break detection module 333 first determines whether mobile bug 110 has executed auto-reestablishment module 213, and if so, determines whether auto-reestablishment successfully occurred. Where mobile bug 110 has not executed auto-reestablishment module 213, or where auto-reestablishment module 213 is determined to have failed, call break detection module 333 may transmit the indication that the call is broken, and/or that one or more particular components of the data is lost.

Remote reestablishment module 334 detects a request from monitoring device 140 to reestablish the one-way communications session based on a call break having been detected. Responsive to receiving such a request, remote reestablishment module 334 may reestablish the one-way communications session in the same manner described above with respect to initially establishing the one-way communications session. Where a component of data of a one-way communications session is lost, while another component continues to be transmitted, remote reestablishment module 334 may re-establish a data connection that enables that part of the data to be transmitted from mobile bug 110 to monitoring device 140 again, without reestablishing a link relating to a healthy data link.

In an embodiment, remote reestablishment module 334 determines whether the remote reestablishment request is received during a window of consent. Remote reestablishment module 334 may perform this determination by retrieving window of consent information from mobile bug 110, and/or instructing monitoring service 330 to execute period of consent module 335. Responsive to determining that the remote reestablishment request is received during the window of consent, remote reestablishment module 334 reestablishes the one-way communications session (in whole or in part, as described above).

Window of consent module 335 determines whether a remote reestablishment request is received during a window of consent. Where windows of consent are stored within monitoring service 330, window of consent module 335 retrieves the window of consent from memory, and compares a time of, or indicated by, a remote reestablishment request to the window of consent. Where windows of consent are stored within mobile bug 110, window of consent module 335 retrieves the window of consent from mobile bug 110 to perform the comparison. In an embodiment where a data component is specifically requested in a reestablishment request, window of consent module 335 determines whether the specific data component is authorized during the window of consent. Responsive to determining that the time of, or indicated by, the remote reestablishment request is within the window of consent, and optionally, that the data component type of the reestablishment request is allowed during the window of consent, window of consent module 335 determines that remote reestablishment is permissible. Responsive to determining that the time of, or indicated by, the remote reestablishment request is outside the window of consent, window of consent module 335 determines that remote reestablishment is impermissible, and instructs monitoring service 330 to discard the request. In an embodiment, rather than discarding the request, consent module 335 may transmit a notification to mobile bug 335 including a selectable option to allow or decline the reestablishment request. In an embodiment, where remote reestablishment is impermissible, window of consent module instructs monitoring service 330 to transmit a message to monitoring device 140 that the reestablishment request is denied, and optionally includes the reasoning that the reestablishment request is outside of the window of consent.

Conflict resolution module 336 determines whether multiple monitoring devices 140 have requested reestablishment of a one-way communications session. To perform this determination, conflict resolution module 336 may determine whether multiple monitoring devices 140 have requested reestablishment at the same time, or within a predetermined amount of time with respect to one another (e.g., within 30 seconds of another). Responsive to determining that multiple monitoring devices 140 have requested reestablishment of the one-way communications session, conflict resolution module 336 may instruct monitoring service 330 to disregard attempts beyond a first received attempt, thus ensuring that multiple reconnection instructions are not sent to mobile bug 110. Alternatively, or additionally, conflict resolution module 336 may instruct monitoring service 330 to circulate an identity of the monitoring device 140 that successfully requested reestablishment, thus informing the rest of the monitoring team using the other monitoring devices that reestablishment has occurred. Alternatively, or additionally, the mere fact of successful reestablishment may be announced to the other monitoring devices to inform the monitoring team that the connection has been reestablished.

Remote deactivation module 337 detects a deactivation request from monitoring device 140 during a one-way communications session. Responsive to receiving the deactivation request, remote deactivation module 337 disconnects the one-way communications session. In an embodiment, remote deactivation module 337 may instruct mobile bug 110 to refrain from executing auto-reestablishment module 213, to ensure that the one-way communications module is not accidentally reestablished. Where different data components are being transmitted in the one-way communications session over different signals (e.g., a data signal transmitting GPS, and a telephony signal transmitting audio), providers of those signals (e.g., a telephony provider and a data signal provider) may be separately requested to tear down the signals. Remote deactivation may be useful when the transmitting person does not have his or her hands free to terminate the one-way communications session, or has forgotten to terminate the one-way communications session. Remote deactivation may additionally be useful where the transmitting person is interacting with an individual that should not be recorded.

Monitoring Device Details

Figure 4:
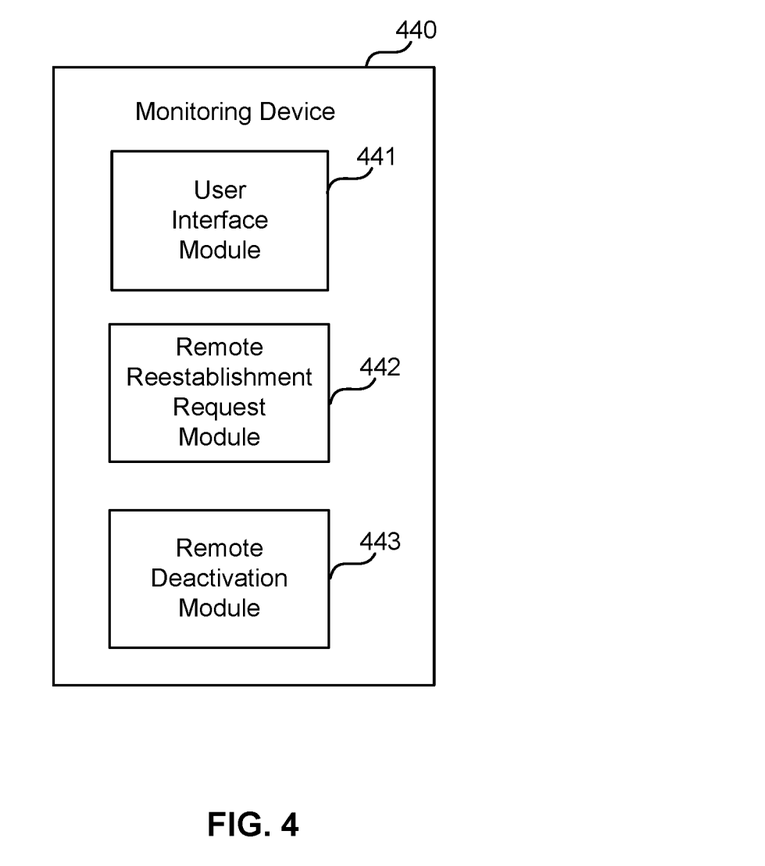
FIG. 4 illustrates one embodiment of a detailed view of modules within a monitoring device.

FIG. 4 illustrates one embodiment of a detailed view of modules within a monitoring device. Monitoring device 440 includes all functionality described above with respect to monitoring device 140, and includes user interface module 441, remote reestablishment request module 442, and remote deactivation module 443. User interface module 441 provides a user interface through which a member of the monitoring team may enter commands or receive information. For example, a member of the monitoring team using monitoring device 440 may select a mobile bug 110 with which to request establishment of a one-way communications session, or to receive a notification that a one-way communications session has begun. User interface module 441 may output data (e.g., audio, GPS, etc.) to the member of the monitoring team during the one-way communications session. User interface module 441 may indicate that come or all data of a one-way communications session is no longer being received due to a break in the one-way communications session. User interface module 441 may receive a command from the member of the monitoring team to reestablish the one-way communications session, and may responsively instruct monitoring device 440 to execute remote reestablishment request module 442. User interface module 441 may output confirmation that the request is successfully processed, or denial of the request, optionally with reasoning for why the request was denied, to the member of the monitoring team. User interface module 441 may receive a command to deactivate a one-way communications session, and may responsively instruct monitoring device 440 to execute remote deactivation module 443.

Remote reestablishment request module 442, responsive to receiving user input to request reestablishment of the one-way communication, instructs monitoring device 440 to request reestablishment of the one-way communications session by transmitting a request to the monitoring service 130 and/or mobile bug 110. Remote deactivation module 443, responsive to receiving user input to request reestablishment of the one-way communication, instructs monitoring device 440 to request, from monitoring service 130, that the one-way communications session be disconnected. In an embodiment, remote deactivation module 443 may automatically cause a deactivation request to be sent to monitoring service 130. A member of the monitoring team may input parameters that, if detected, trigger remote deactivation module 443 to request deactivation. For example, the parameters may be spoken keywords (e.g., "you are under arrest," or reading of Miranda rights), voice detection that matches a certain voice signature, facial recognition that matches a certain persons identity, and the like.

Computing Machine Architecture

Figure 5:
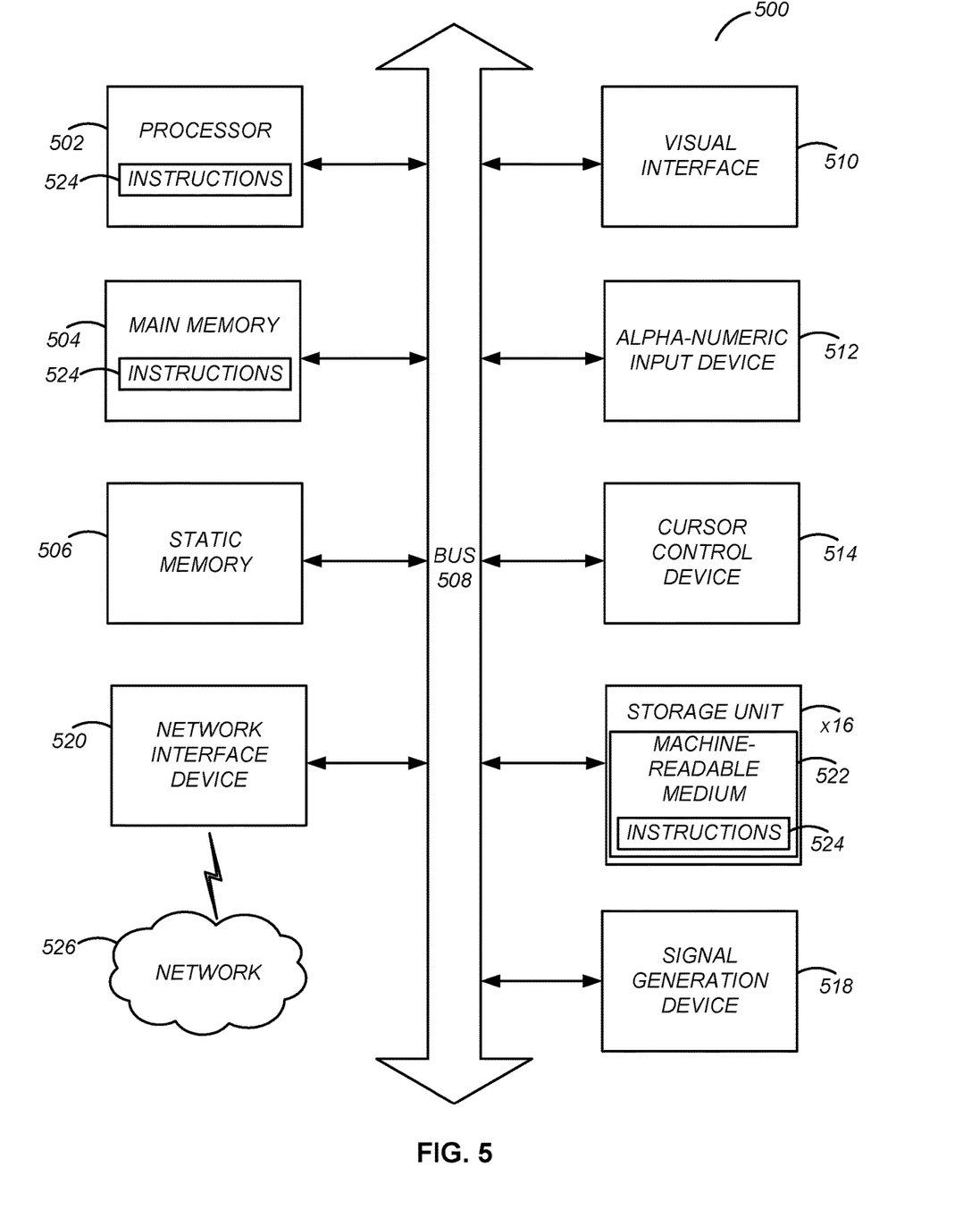
FIG. 5 illustrates one embodiment of a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). The example machine may be used to implement mobile bug 110, monitoring service 130, and/or monitoring device 140. Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, a smart watch, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

One-Way Communications Session Re-Establishment

Figure 6:
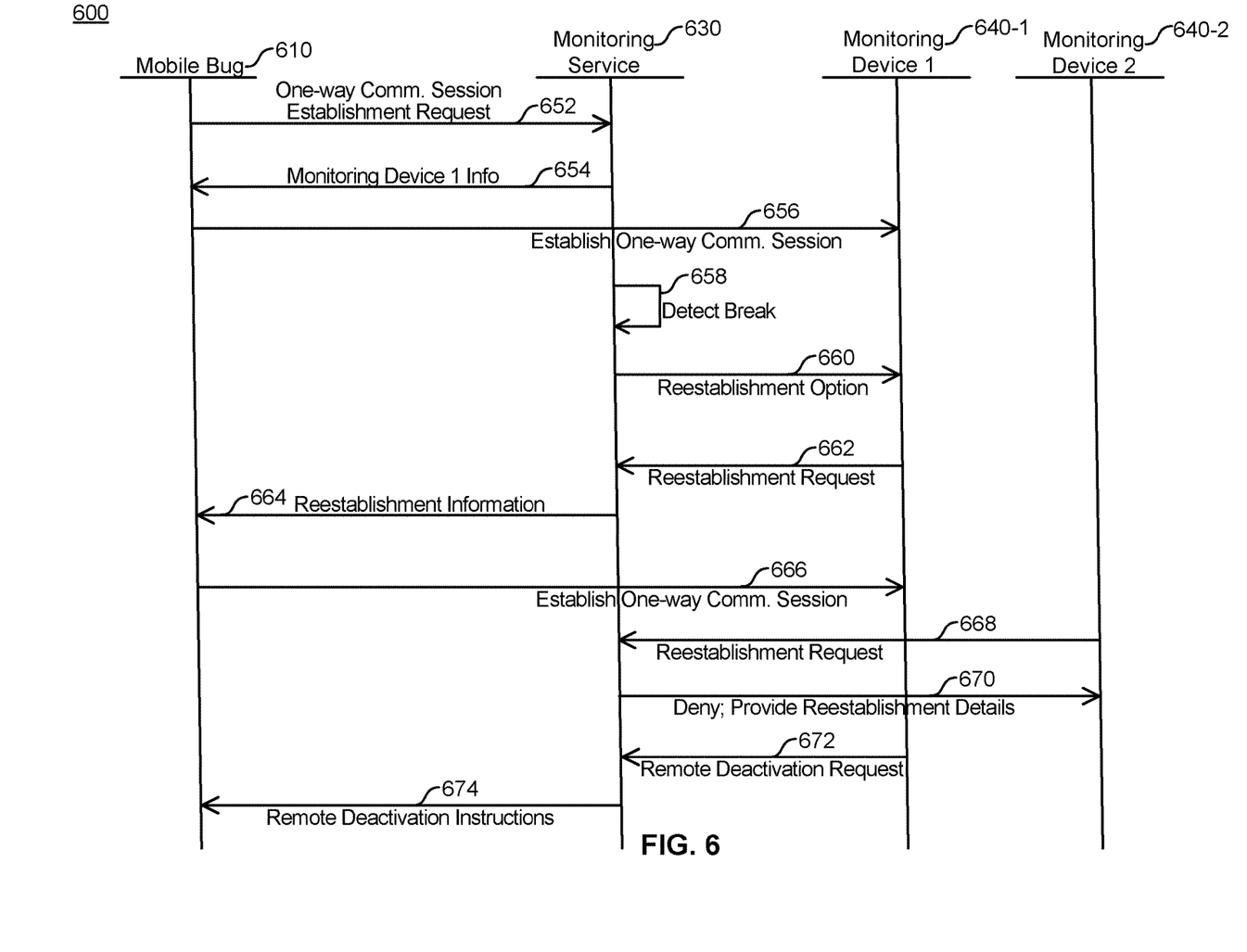
FIG. 6 illustrates one embodiment of a data flow diagram illustrating an exemplary data flow for establishing and reestablishing a one-way communications session between a mobile bug and a monitoring device.

FIG. 6 illustrates one embodiment of a data flow diagram illustrating an exemplary data flow for establishing and reestablishing a one-way communications session between a mobile bug and a monitoring device. Data flow 600 depicts a data flow including mobile bug 610, monitoring service 630, monitoring device 640-1, and monitoring device 640-2, which include the same weight of description of their counterparts described with respect to FIGS. 1-4 and share like reference numerals. Data flow 600 begins with mobile bug 610 transmitting 652 a one-way communications session establishment request to monitoring service 630 (e.g., by executing one-way communications session module 212). Though not depicted, in an embodiment, monitoring device 640-1 may transmit 652 the one-way communications session establishment request 652, rather than mobile bug 610. Responsive to receiving the one-way communications session establishment request, monitoring service 630 transmits 654 information relating to monitoring device 640-1 to mobile bug 610, and mobile bug 610 transmits 656 a communication to monitoring device 640-1 that establishes a one-way communications session. Elements 654 and 656 of data flow 600 are merely exemplary; other ways of establishing a one-way communications session will be readily understood by one of ordinary skill in the art having read this disclosure and the disclosure incorporated by reference herein.

Following establishment of the one-way communications session, monitoring service 630 may detect 658 a break in the one-way communications session (e.g., by executing call break detection module 333). Responsive to detecting a break, monitoring service 630 may transmit 660 a reestablishment option to monitoring device 640-1, or may alternatively transmit a signal that activates a reestablishment option using user interface module 441 of monitoring device 640-1. Monitoring device 640-1 may transmit 662 a reestablishment request to monitoring service 630 (e.g., using remote reestablishment request module 442). Monitoring service 630 may responsively execute window of consent module 335, and if the reestablishment request satisfies the window of consent, monitoring service 630 may transmit 664 a reestablishment instruction to mobile bug 610. The reestablishment instruction may indicate a data component, or a full reestablishment, to be reestablished. Mobile bug 610 may responsively transmit 666 a communication to monitoring device 640-1 to reestablish the one-way communications session.

Monitoring device 640-2 may also transmit 668 a reestablishment request to monitoring service 630; however, monitoring service 630 may deny 670 the request, and may optionally provide reestablishment details that indicate that monitoring device 640-1 successfully reestablished the one-way communication. Monitoring device 640-1 may transmit 672 a remote deactivation request (e.g., using remote deactivation module 443) to monitoring service 630, and monitoring service 630 may transmit 674 remote deactivation instructions to mobile bug 610. Again, the elements of data flow 600 are merely exemplary; alternate data flows have been described with respect to FIGS. 1-4 above, and further alternative data flows would be understood by one of ordinary skill in the art to form a part of this disclosure.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a monitoring device to reestablish a one-way communications session with a mobile bug through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for reestablishing a one-way communications session, the method comprising:
   establishing a one-way communications session between a mobile bug and a monitoring device, the one-way communications session providing data from the mobile bug to the monitoring device during the one-way communications session without audio being provided from the monitoring device to the mobile bug during the one-way communications session;
   detecting a break in the one-way communications session;
   determining whether the mobile bug has activated a remote reestablishment feature;
   responsive to determining that the mobile bug has activated the remote reestablishment feature, instructing the monitoring device to output an option to reestablish the one-way communications session;
   detecting a selection of the option to reestablish the one-way communications session; and
   responsive to detecting the selection, correcting the break in the one-way communications session.

2. The method of claim 1, further comprising:
   receiving an establishment request to establish the one-way communications session from the mobile bug, wherein
   establishing the one-way communications session between the mobile bug and the monitoring device occurs responsive to receiving the establishment request from the mobile bug.

3. The method of claim 2, wherein receiving the establishment request comprises:
   detecting a symbol entered into an application that activates the mobile bug;
   determining that the symbol corresponds to the establishment request; and
   determining that the establishment request has been received.

4. The method of claim 1, wherein the data comprises a plurality of types of data, and wherein detecting a break in the one-way communications session comprises detecting a loss of transmission of a type of data of the plurality of types of data while each other type of the plurality of types of data continues to be provided from the mobile bug to the monitoring device during the one-way communications session.

5. The method of claim 4, wherein correcting the break in the one-way communications session comprises:
   transmitting a reestablishment request to the mobile device that requests establishment of a connection corresponding to the type of data; and
   receiving reestablished data corresponding to the type of data in addition to receiving each other type of data from the mobile bug.

6. The method of claim 1, further comprising, responsive to detecting the selection of the option to reestablish the one-way communications session:
   determining whether the remote reestablishment feature indicates a window of time during which reestablishing the one-way communications session is authorized; and
   responsive to determining that the remote reestablishment feature indicates the window of time, determining whether a time at which the selection of the option was detected is within the window of time, wherein correcting the break in the one-way communications session is performed responsive to determining that the time at which the selection of the option was detected is within the window of time.

7. The method of claim 6, wherein the window of time is customized by a user of the mobile bug.

8. The method of claim 1, wherein the monitoring device is a first monitoring device, and wherein the method further comprises:
receiving a request from a second monitoring device to reestablish the one-way communications session; and
denying the request from the second monitoring device based on reestablishment having been performed by the first monitoring device.

9. The method of claim 8, further comprising:
outputting indicia to the second monitoring device that the first monitoring device has successfully reestablished the one-way communications session.

10. The method of claim 1, further comprising:
receiving a deactivation request from the monitoring device to deactivate the one-way session; and
responsive to receiving the deactivation request, transmitting an instruction to the mobile bug to end the one-way communications session by discontinuing the providing of the data to the monitoring device.

11. A non-transitory computer-readable medium comprising executable instructions encoded thereon for reestablishing a one-way communications session, the instructions, when executed by at least one processor, causing the at least one processor to perform operations, the instructions comprising instructions to:
establish a one-way communications session between a mobile bug and a monitoring device, the one-way communications session providing data from the mobile bug to the monitoring device during the one-way communications session without audio being provided from the monitoring device to the mobile bug during the one-way communications session;
detect a break in the one-way communications session;
determine whether the mobile bug has activated a remote reestablishment feature;
responsive to determining that the mobile bug has activated the remote reestablishment feature, instruct the monitoring device to output an option to reestablish the one-way communications session;
detect a selection of the option to reestablish the one-way communications session; and
responsive to detecting the selection, correct the break in the one-way communications session.

12. The non-transitory computer-readable medium of claim 11, wherein the instructions further comprise instructions to:
receive an establishment request to establish the one-way communications session from the mobile bug, wherein establishing the one-way communications session between the mobile bug and the monitoring device occurs responsive to receiving the establishment request from the mobile bug.

13. The non-transitory computer-readable medium of claim 12, wherein the instructions to receive the establishment request comprise instructions to:
detect a symbol entered into an application that activates the mobile bug;
determine that the symbol corresponds to the establishment request; and
determine that the establishment request has been received.

14. The non-transitory computer-readable medium of claim 11, wherein the data comprises a plurality of types of data, and wherein the instructions to detect a break in the one-way communications session comprise instructions to detect a loss of transmission of a type of data of the plurality of types of data while each other type of the plurality of types of data continues to be provided from the mobile bug to the monitoring device during the one-way communications session.

15. The non-transitory computer-readable medium of claim 14, wherein the instructions to correct the break in the one-way communications session comprise instructions to:
transmit a reestablishment request to the mobile device that requests establishment of a connection corresponding to the type of data; and
receive reestablished data corresponding to the type of data in addition to receiving each other type of data from the mobile bug.

16. The non-transitory computer-readable medium of claim 11, wherein the instructions further comprise instructions to, responsive to detecting the selection of the option to reestablish the one-way communications session:
determine whether the remote reestablishment feature indicates a window of time during which reestablishing the one-way communications session is authorized; and
responsive to determining that the remote reestablishment feature indicates the window of time, determine whether a time at which the selection of the option was detected is within the window of time, wherein correcting the break in the one-way communications session is performed responsive to determining that the time at which the selection of the option was detected is within the window of time.

17. The non-transitory computer-readable medium of claim 16, wherein the window of time is customized by a user of the mobile bug.

18. The non-transitory computer-readable medium of claim 11, wherein the monitoring device is a first monitoring device, and wherein the instructions further comprise instructions to:
receive a request from a second monitoring device to reestablish the one-way communications session; and
deny the request from the second monitoring device based on reestablishment having been performed by the first monitoring device.

19. The non-transitory computer-readable medium of claim 18, wherein the instructions further comprise instructions to:
output indicia to the second monitoring device that the first monitoring device has successfully reestablished the one-way communications session.

20. The non-transitory computer-readable medium of claim 11, wherein the instructions further comprise instructions to:
receive a deactivation request from the monitoring device to deactivate the one-way session; and
responsive to receiving the deactivation request, transmit an instruction to the mobile bug to end the one-way communications session by discontinuing the providing of the data to the server.

* * * * *